(12) United States Patent
Chase

(10) Patent No.: US 11,946,797 B2
(45) Date of Patent: Apr. 2, 2024

(54) VISUAL SONIC CONDUIT LOCATOR

(71) Applicant: Arnold Chase, West Hartford, CT (US)

(72) Inventor: Arnold Chase, West Hartford, CT (US)

(*) Notice: Subject to any disclaimer, the term of this patent is extended or adjusted under 35 U.S.C. 154(b) by 0 days.

(21) Appl. No.: 18/366,057

(22) Filed: Aug. 7, 2023

(65) Prior Publication Data

US 2024/0044697 A1 Feb. 8, 2024

Related U.S. Application Data

(63) Continuation-in-part of application No. 17/879,158, filed on Aug. 2, 2022, now Pat. No. 11,722,227.

(51) Int. Cl.
*G01H 3/12* (2006.01)
*H04R 1/08* (2006.01)
(Continued)

(52) U.S. Cl.
CPC ........... *G01H 3/12* (2013.01); *H04R 1/08* (2013.01); *H04R 1/326* (2013.01); *H04R 3/04* (2013.01); *H04R 29/008* (2013.01)

(58) Field of Classification Search
CPC ........... G01H 1/003; G01H 1/00; G01H 3/00; G01H 13/00; G01H 3/08; G01H 1/006; G01H 1/10; G01H 11/08; G01H 1/14; G01H 11/00; G01H 1/08; G01H 1/12; G01H 11/06; G01H 3/12; G01H 3/14; G01H 15/00; G01H 9/00; G01H 1/16; G01H 3/10; G01H 5/00; G01H 3/04; G01M 13/045; G01M 13/028; G01M 7/025; G01M 15/12; G01M 5/0066; G01M 1/22; G01M 7/08; G01M 13/021; G01M 13/04; G01M 7/022; G01M 9/06; G01M 5/0033; G01M 5/0091; G01M 13/02; G01M 13/025; G01M 15/00; G01M 15/042; G01M 15/11; G01M 17/007; G01M 3/24; G01M 5/005; G01M 7/00; G01M 11/081; G01M 5/0016; G01M 5/0075; G01M 9/00; G01N 29/46; G01N 29/12; G01N 29/14; G01N 2291/2696; G01N 2291/014; G01N 29/348; G01N 29/11; G01N 29/42; G01N 2291/02827; G01N 2291/015; G01N 2291/2693; G01N 29/045; G01N 2291/102; G01N 29/036;
(Continued)

(56) References Cited

U.S. PATENT DOCUMENTS 4,656,463 A * 4/1987 Anders ............... G01S 13/78
340/541
4,827,395 A * 5/1989 Anders ............... G07C 3/00
340/12.51
(Continued)

*Primary Examiner* — Daniel L Murphy
*Assistant Examiner* — Amie M Ndure
(74) *Attorney, Agent, or Firm* — McCormick, Paulding & Huber PLLC

(57) ABSTRACT

A visual sonic conduit locator includes a conduit size audio filter control, sensitivity control, and one or more visual indicators. The conduit size audio filter control is configured to optimize to the size of the conduit of interest. The sensitivity control is configured to detect a target sound and alter the amount of the target sound to that of a visual display level. The visual display level is represented by visual indicators. The visual indicators are configured to visually display a received audio level detected by the locator.

20 Claims, 5 Drawing Sheets

(51) Int. Cl.
*H04R 1/32* (2006.01)
*H04R 3/04* (2006.01)
*H04R 29/00* (2006.01)

(58) Field of Classification Search
CPC ............. G01N 29/4427; G01N 29/449; G01N 2291/02416; G01N 2291/0289; G01N 2291/0427; G01N 2291/106; G01N 2291/2634; G01N 29/046; G01N 29/2418; G01N 29/2437; G01N 29/38; G01N 29/4454; G01N 2291/02854; G01N 2291/044; G01N 2291/2636; G01N 29/04; G01N 29/4436; G01N 2291/023; G01N 2291/0231; G01N 2291/02881; G01N 2291/0422; G01N 2291/048; G01N 2291/265; G01N 2291/269; G01N 29/07; G01N 29/223; G01N 29/30; G01N 29/48; G01N 29/52; G01N 15/02; G01N 2291/02818; G01N 2291/02872; G01N 29/02; G01N 29/4472; G01N 3/30; G01N 15/04; G01N 19/04; G01N 2021/1706; G01N 21/1702; G01N 2203/0025; G01N 2203/0048; G01N 2203/0617; G01N 2203/0676; G01N 2291/012; G01N 2291/0224; G01N 2291/0237; G01N 2291/02408; G01N 2291/02458; G01N 2291/02466; G01N 2291/02491; G01N 2291/0251; G01N 2291/0255; G01N 2291/0256; G01N 2291/02836; G01N 2291/02863; G01N 2291/0421; G01N 2291/0423; G01N 2291/0426; G01N 2291/0428; G01N 2291/101; G01N 2291/105; G01N 2291/2698; G01N 25/147; G01N 27/725; G01N 29/0609; G01N 29/0618; G01N 29/0672; G01N 29/069; G01N 29/22; G01N 29/245; G01N 29/2475; G01N 29/27; G01N 29/28; G01N 29/326; G01N 29/34; G01N 29/4418; G01N 29/4481; G01N 3/066; G01N 3/32; G01N 3/36; G01N 3/38; G01N 3/58; G01N 30/8682; G01N 33/025; G01N 33/54373; G01N 2015/0053; G01N 21/274; G01N 21/31; G01N 21/3577; G01N 21/359; G01N 2203/0016; G01N 2291/011; G01N 2291/0226; G01N 29/024; G01N 29/032; G01N 29/346; G01N 29/40; G01N 30/7233; G01N 33/10; G01N 33/28; G01B 17/02; G01B 11/0666; G01B 17/00; G01B 21/24; G01B 7/02; G01B 11/16; F16C 19/527; F16C 2233/00; F16C 19/525; F16C 19/55; F16C 2360/23; F16C 19/06; F16C 19/52; F16C 19/522; F16C 2300/02; F16C 33/583; F16C 33/6622; F16C 35/042; F16C 41/008; F16C 17/243; G07C 3/00; G07C 2205/02; G07C 5/008; G07C 5/0816; G07C 5/00; E21B 44/00; E21B 47/00; E21B 49/003; E21B 12/02; F16K 37/0083; F01D 25/04; F01D 21/00; F01D 21/003
See application file for complete search history.

(56) References Cited

U.S. PATENT DOCUMENTS

| | | | | |
|---|---|---|---|---|
| 5,477,505 | A * | 12/1995 | Drumheller | E21B 47/16 166/250.01 |
| 10,408,050 | B2 * | 9/2019 | Camwell | E21B 47/20 |
| 2004/0130442 | A1 * | 7/2004 | Breed | G06V 20/593 340/449 |
| 2005/0046584 | A1 * | 3/2005 | Breed | G06F 3/0237 340/13.31 |
| 2005/0192727 | A1 * | 9/2005 | Shostak | G07C 5/008 701/1 |
| 2005/0273218 | A1 * | 12/2005 | Breed | G06K 7/10178 701/2 |
| 2008/0157940 | A1 * | 7/2008 | Breed | B60R 21/013 340/425.5 |
| 2009/0046538 | A1 * | 2/2009 | Breed | B60R 21/01552 706/20 |
| 2016/0024913 | A1 * | 1/2016 | Camwell | G01V 1/523 367/82 |
| 2016/0242676 | A1 * | 8/2016 | Grossmann | A61B 5/7257 |
| 2019/0137454 | A1 * | 5/2019 | Bates | G01S 3/80 |
| 2020/0173602 | A1 * | 6/2020 | Olsson | G01V 1/42 |
| 2020/0333429 | A1 * | 10/2020 | Neser | G01S 5/22 |
| 2021/0063569 | A1 * | 3/2021 | Crew | G01S 15/04 |

* cited by examiner

VISUAL SONIC CONDUIT LOCATOR

CROSS-REFERENCE TO RELATED APPLICATION

This application is a continuation-in-part of U.S. patent application Ser. No. 17/879,158, filed Aug. 2, 2022, which is incorporated herein by reference in its entirety.

TECHNICAL FIELD

The present disclosure relates to sonic conduit tracer systems and visual sonic conduit locators.

BACKGROUND

There are common use electronic wire tracing tools, known as "toners," that allow specific wires or cables within a conduit to be easily identified. However, there exists no simple way or device to visually identify a particular empty conduit from another empty conduit.

SUMMARY

The present disclosure provides a sonic conduit tracer system that fills this need by using sound waves that are sent through a conduit to easily identify the remote or distant end of a particular conduit from among a plethora of similar conduits or pipes in a given area. Such sound waves may be provided, by way of non-limiting examples, as audible tones or as audible pulses.

While the sonic conduit tracer system may easily point to or identify a particular conduit of interest at a particular location, there is still the logistical matter of first locating the general area, equipment room, or other termination location of the distant conduit end itself, regardless of whether the conduit is among a group of other conduits or by itself. Thus, the sonic conduit tracer system may also facilitate locating the distant end of a specific conduit among a grouping of empty or nearly empty conduits.

A sonic conduit tracer system for visually determining the identification and location of a specific empty conduit is disclosed herein. The sonic conduit tracer system may utilize an audio transmission to localize the identification and/or terminating end of a conduit from among a plethora of empty conduits or termination locations.

The sonic conduit tracer system may also be operated in a "conduit length determining mode" so as to allow the sonic conduit tracer system to automatically calculate the estimated total length of a conduit. The sonic conduit tracer system may automatically calculate the estimated length of a conduit by transmitting audio pulses and then listening for and calculating the time delay until the transmitted pulses have returned to the transmitting location. In this exemplary embodiment, the measured propagation delay time for a specific interior diameter dimension is utilized to calculate an estimated conduit length.

The sonic conduit tracer system for determining the identification and location of an empty conduit by utilizing an audio transmission to localize the identification and/or terminating end of a conduit from among a plethora of empty conduits or termination locations may be configured to optimize or adjust the transmitted audio frequencies and/or pulse rate(s) of the emitted audio transmissions according to the interior dimensions of the conduit being used to locate its terminating end. According to an embodiment, the sonic conduit tracer system may automatically sense or determine that a specific sized conduit adapter has been fitted to the transmitting device, wherein the sonic conduit tracer system may use this information to optimize the transmitted signal.

According to another embodiment, a self-powered sonic conduit tracer system may be configured to attach to a common in-use wire "snake" or otherwise known as a wire fishing tool. This freestanding sonic conduit tracer system may be pushed into or guided through a conduit while actively emitting one or more distinctive tone(s) and/or cadence pattern(s). With this embodiment, the sonic conduit tracer system emitting the identifying sound may be placed closer to the termination end of a conduit.

A sonic conduit tracer system including a combination sonic transmitter, a sonic receiver and a spectrum analyzer is disclosed. The transmitter may be an audio transmitter configured to transmit an audio signal down an interior length of an empty conduit from a proximate end of a conduit. The receiver may be an audio receiver configured to receive an audio return signal. The spectrum analyzer may be an audio spectrum analyzer configured to analyze the returned audio signal and to thereby facilitate the determination of a location of a distant end of the conduit.

According to some embodiments, the spectrum analyzer of the sonic conduit tracer may be configured to use the return signal to determine an estimated length of the conduit. For example, according to an embodiment, an audio spectrum analyzer may determine an estimated length of the conduit based on one or more audio differences such as particular audio frequency attenuation between a transmitted audio signal and the returned audio signal. According to another embodiment, the spectrum analyzer may determine an estimated length of the conduit based on a delay between the time of a transmitted audio pulse and the time of a returned echo pulse, a time for a transmitted pulse to decay to a predetermined level, a change in harmonic characteristics, and/or an attenuation of a part of a total spectrum of the transmitted signal.

According to another aspect, the transmitter of the sonic conduit tracer may be configured to transmit a variety of different signals. According to one embodiment, the transmitter may be configured to pulse an audio signal at a constant pulse rate or at a varying pulse rate. According to another embodiment, the transmitter may be configured to transmit an audio signal at a single frequency. Alternatively, the transmitter may be configured to transmit an audio signal with a multiple audio frequency spread. According to another embodiment the transmitter may be configured to transmit a first audio signal having a first spectral bandwidth, a first pulse repetition rate and/or a first pulse frequency characteristic. Additionally, the transmitter may be configured to transmit a first audio signal having a first spectral bandwidth, a first pulse repetition rate and/or a first pulse frequency characteristic, and may further be configured to transmit a second audio signal having a second spectral bandwidth, a second pulse repetition rate and/or a second pulse frequency characteristic. According to even another embodiment, the transmitter may be configured to transmit sound waves which comprise white noise down the length of the conduit.

According to an aspect, the sonic conduit tracer may be configured to automatically determine an interior diameter of the conduit. According to one embodiment, the conduit tracer may be configured to transmit a first audio signal when the conduit has a first interior diameter and to transmit a second audio signal when the conduit has a second interior diameter.

According to even another embodiment, the sonic conduit tracer may be configured to be at least partially inserted into the proximate end of the conduit. Optionally, the sonic conduit tracer system may be configured to be fully inserted into the conduit to allow it to travel down the interior of the conduit.

According to some embodiments, a method of tracing a conduit includes transmitting a sonic signal down an interior length of an empty conduit from a proximate end of the conduit, receiving a sonic return signal at the proximate end of the conduit, and analyzing the sonic return signal to determine an estimated length of the conduit. The sonic signal may be a continuous audio signal and/or a pulsed audio signal. According to some embodiments, the step of analyzing may include determining the estimated length of the conduit based on one or more differences between the transmitted signal and the return signal. For example, the step of analyzing may include determining the estimated length of the conduit based on a delay between the time of a transmitted pulse and the time of a return echo pulse, a time for a transmitted pulse to decay to a predetermined level, a change in harmonic characteristics, and/or an attenuation of a part of a total spectrum of the audio transmitted signal.

According to other embodiments, the step of transmitting may include transmitting a signal having a pulsed signal, transmitting a signal having a single audio frequency, transmitting a signal having a multiple audio frequency spread, transmitting a signal having a first spectral bandwidth, transmitting a signal having a first pulse repetition rate and/or transmitting a signal having a first pulse frequency characteristic. According to another embodiment, the step of transmitting may include transmitting a first signal having a first spectral bandwidth, a first pulse repetition rate and/or a first pulse frequency characteristic, and then transmitting a second signal having a second spectral bandwidth, a second pulse repetition rate and/or a second pulse frequency characteristic. According to even another embodiment, the step of transmitting may include transmitting sound waves which are "white noise" down the length of the conduit.

According to another aspect, the method of tracing a conduit may further include the audio transmitter automatically determining an interior diameter of the conduit and selecting an optimized audio frequency based on the detected conduit size. Another aspect the method of determining the transmitted audio operating frequency(s) may be manually selected based upon a manual conduit diameter size determination. Further, the step of transmitting may include transmitting a first signal when the conduit has a first interior diameter and transmitting a second signal, different from the first signal, when the conduit has a second interior diameter.

According to a final aspect, a sonic conduit tracer may include an audio transmitter configured to transmit an audio signal down an interior length of an empty conduit, wherein the audio transmitter is configured to fit inside the empty electrical conduit and is further configured to be attached to an end of a flexible transmitter positioning feeding mechanism.

In situations where it is difficult to determine which conduit amongst a plurality of empty conduits is emitting sounds from an active sonic conduit tracer system, a solution is needed. The present disclosure provides a visual sonic conduit locator configured to be used remotely from, but in conjunction with, the sonic conduit tracing system, and as such is arranged to be located at the opposite end of a conduit that is being fed audio from the sonic conduit tracing system. While a sonic conduit tracing system is useful by manually listening for sounds generated at an opposite end of a conduit, in a situation where many conduits terminate near one another, a visual sonic conduit locator may be used to assist the location of a target conduit that is being fed by sonic conduit tracing system.

According to one aspect, a visual sonic conduit locator is configured to be a hand-held device that provides an operator with the ability to visually discern changes in an audio level to a finer degree than is possible with an unaided person seeking to locate a target conduit is emitting a sound.

While the human ear is able to quickly generalize the location of a sound within an area (e.g., ±5 feet), the task of determining a target conduit presenting a sound amongst a plurality of conduits can be a cumbersome and time-consuming process, especially in an area of high ambient noise such as a construction site.

A visual sonic conduit locator is configured to detect and/or seek for a specific audio frequency, cadence pattern, or other distinctive properties, thus it can better determine a particular target sound from amongst a muddle of sounds than a human ear.

The present disclosure provides a visual sonic conduit locator that determines which conduit is emitting the sound. The visual sonic conduit locator for determining the location of an empty conduit may be configured to a target conduit size. According to some embodiments, a visual sonic conduit locator is configured to automatically determine what the size of the target conduit based on the deteriorating effects of the target conduit on the target sound.

In some embodiments, a visual sonic conduit locator include a body, a microphone connected to the body, one or more visual indicators connected to the body, a processor operatively connected to the one or more visual indicators and configured to cause the one or more visual indicators to display a magnitude of sound level relative within a variably adjustable full-scale range based on a sound signal detected by the microphone, and a sensitivity control configured to cause the processor to adjust the full-scale range thereby setting the processor to more sensitively or less sensitively cause the one or more visual indicators to display the magnitude of sound level based on the sound signal detected by the microphone.

According to some embodiments, a method of operating a visual sonic conduit locator includes moving a visual sonic conduit locator in an area where a sound signal is provided from a sonic conduit tracer system through a target conduit among a plurality of conduits, detecting the sound signal with a microphone of the visual sonic conduit locator, displaying a magnitude of sound level of the detected sound signal with one or more visual indicators of the visual sonic conduit locator, and adjusting a sensitivity control to cause a processor of the visual sonic conduit locator to adjust a full-scale range.

According to some embodiments, a visual sonic conduit locator includes a body, a microphone connected to the body, a display connected to the body and configured to display a magnitude of sound level based on a sound signal detected by the microphone, and a sensitivity control configured to adjust a range the magnitude of sound level is displayed within through the display.

A visual sonic conduit locator including a combination conduit size audio filter control, a sensitivity control, and visual indicators is disclosed. The conduit size audio filter control is configured to set the size of the conduit of interest. The sensitivity control is configured to alter the amount of the target sound to that of a visual display level. The visual display level is represented by visual indicators. The visual indicators are configured to visually display a received audio level detected by the sensitivity control.

According to one aspect, the visual sonic conduit locator is an audio spectrum analyzer preconfigured for a particular conduit size. After the given conduit size (e.g., conduit inner diameter) is configured by the conduit size audio filter control, the visual sonic conduit locator is configured to look for specific audio frequencies, cadence patterns, or other distinctive sound properties. Through this configuration, the locator finds the target sound produced by the sonic conduit tracer system through the target conduit.

According to some embodiments, the operator of the visual sonic conduit locator adjusts the sensitivity control which alters the amount of the target sound to that of a visual display level. As the operator gets closer to the target conduit, the visual display level becomes more pronounced in that more visual indicators activate and/or a different type of indication is provided.

According to some embodiments, a method of using a visual sonic conduit locator includes configuring a conduit size audio control to selectively search for a target sound, adjusting the sensitivity control to alter the target sound into a visual display, and lowering the sensitivity control until the target sound and target conduit is located. According to some embodiments, the step of configuring a conduit size audio control may include determining the conduit size and the specific audio frequency, cadence pattern, or other distinctive sound property. The step of configuring may also include identifying deteriorating effects on the target sound.

According to some embodiments, the step of adjusting the sensitivity control to alter the target sound into a visual display includes determining whether the visual sonic conduit locator is physically approaching the target sound.

According to some embodiments, the step of lowering the sensitivity control until the target sound and target conduit is located includes determining, utilizing the visual indicators, the amount of headroom to leave available.

DETAILED DESCRIPTION

A sonic conduit tracer system for determining the length of a conduit of an empty conduit, for locating the terminating (or distant) end of the conduit from among a plethora of possible termination locations and/or for identifying the terminating end of a specific conduit from among a plethora of other conduits is herein disclosed. The sonic conduit tracer system utilizes one or more sonic transmissions traveling within the conduit. A "sonic signal," as used herein, means a sound wave having any or multiple simultaneous frequencies. An "audio signal," as used herein, means a sound wave having frequencies in the range of human hearing, e.g., typically frequencies in the range of 20 to 20,000 hz.

Figure 1:
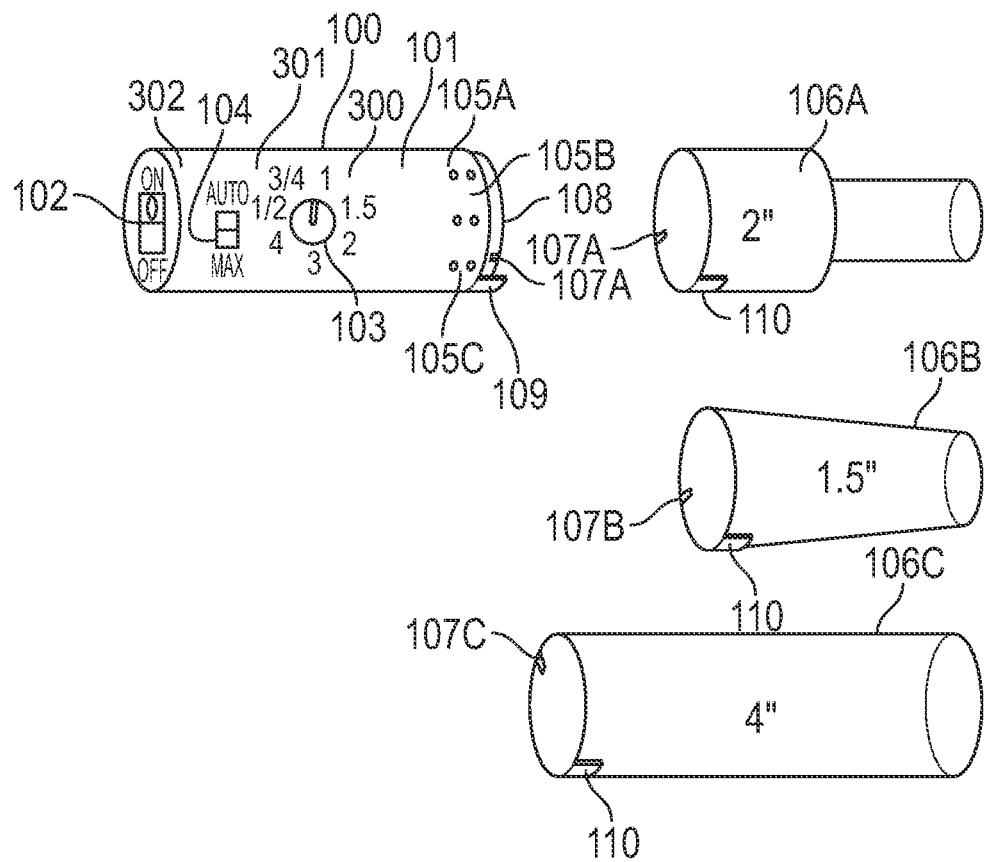
FIG. 1 schematically shows a sonic conduit tracer system in accordance with embodiments of the present disclosure.

Referring to FIG. 1, a sonic conduit tracer system 100 is shown in accordance with the present disclosure. The system 100 includes a sonic transmitter 300, a sonic receiver 301 and a sonic spectrum analyzer 302. The sonic transmitter 300 is configured to transmit a sonic signal, the sonic receiver 301 is configured to receive a sonic signal, and the sonic spectrum analyzer 302 is configured to analyze a received sonic signal. The transmitter, receiver and/or the spectrum analyzer may be co-located within a sonic conduit tracer device body 101.

According to one aspect, the sonic transmitter 300 is an audio transmitter, the sonic receiver 301 is an audio receiver, and the sonic spectrum analyzer 302 is an audio spectrum analyzer. The audio transmitter 300 may be specifically configured to transmit an audio signal into and down an interior length of a conduit. Further, the audio transmitter 300 may be configured to transmit a wide variety of audio signals. For example, the audio transmitter 300 may be configured to pulse the audio transmitted signal, to transmit the audio signal at a single frequency, to transmit the audio signal with a multiple frequency spread, to transmit the audio signal in a sequentially varying single frequency manner, etc. Thus, the audio transmitter 300 may be configured to transmit an audio signal having a defined spectral bandwidth, a defined pulse repetition rate and/or a defined pulse audio frequency characteristic. Optionally, the audio transmitter 300 may be configured to transmit a plurality of audio signals for example, the audio transmitter 300 may be configured to transmit a first audio signal having a first defined spectral bandwidth, a first defined pulse repetition rate and/or a first defined pulse frequency characteristic, and the audio transmitter 300 may be configured to transmit a second defined audio transmitted signal having a second defined spectral bandwidth, a second defined pulse repetition rate and/or a second defined pulse frequency characteristic. The audio transmitter 300 may, in certain instances, be configured to combine one or more audio frequency signals. Additionally, the audio transmitter 300 may be configured to modulate a transmitted signal, e.g., sweeping through a frequency spectrum, increasing or decreasing amplitude, changing a pulse characteristic, etc. as would be known by persons of skill in the art given the benefit of this disclosure.

The audio receiver 301 may be specifically configured to receive an audio return signal from an interior length of the conduit. A "return signal," as used herein, means a sound wave that originated as the transmitted signal from an initial location (typically the proximate end of a conduit), which has subsequently reflected off of or otherwise interacted with one or more surfaces such that the spectral characteristic of the original transmitted signal has changed or becomes distorted. For example, the return signal may have different or inconsistent audio frequency characteristics throughout the frequency spectrum, different pulse rates such as caused by the addition of echoes, and/or one or more audio frequencies having been attenuated relative to the original transmitted signal. Moreover, the return audio signal may include multiple, possibly overlapping and/or time-shifted, distorted versions (e.g., echoes) of the original transmitted signal.

The audio spectrum analyzer 302 may be specifically configured to analyze the audio return signal to facilitate the determination of a location of a distant end of the conduit. According to one embodiment, the audio spectrum analyzer 302 may be specifically configured to analyze differences between the audio transmitted signal and the audio return signal to facilitate the determination of a location of a distant end of the conduit. The audio spectrum analyzer 302 may determine a time-delay between the time of a transmitted pulse and the time of a return echo pulse, a time for a transmitted pulse to decay to a predetermined level, a change in harmonic characteristics, and/or an attenuation of a part of a total spectrum of the audio transmitted signal.

According to one aspect, the sonic conduit tracer system 100 may be configured to determine an estimated length of the conduit based on the analysis of the return signal by the audio spectrum analyzer 302. The estimated length to the conduit may further be determined by the spectrum analyzer 302 based on differences between the transmitted audio signal and the audio return signal, based on varying transmitted audio frequencies and the subsequent differences in effect between various audio frequencies such as the time delay between the time of a transmitted pulse and the time of a return echo pulse, based on a time for a transmitted pulse to decay to a predetermined level, based on a change in harmonic characteristics, and/or based on an attenuation of a part of a total spectrum of the transmitted audio signal.

As an example, an estimate length of a conduit may be determined by utilizing established formulas such as Speed=Distance/Time. Since it is well established that sound travels at approximately 340 meters per second at sea level (at standard temperature and pressure), by already knowing the speed is approximately 340 m/s and the time for an echo (divided by ½ to compensate for the return distance), we can easily solve for the distance figure. It should be noted that a distal end of a conduit may be capped or uncapped. If said end is indeed capped, then the receiver will detect a strong echo. If the far end, however, is uncapped then the spectrum analyzer will detect a distortion as the sound wave exits the end of the conduit and the elapsed time to this change will be used as the time figure. The system can differentiate whether the remote end is capped by the lack of a distinct echo and/or a much higher general attenuation. In the event the system determines that the conduit under test is NOT capped, then the detected time figure will NOT be halved as would be the case with a capped conduit.

Different sized conduits have inherently different deteriorating effects on various audio frequencies and their measurement result in attenuation, distortion, etc. so it is important to optimize the audio frequencies used by the audio transmitter depending upon the interior size of a conduit. Thus, the size of the conduit inside diameter may be provided as an input to the sonic conduit tracer system 100 when determining the estimated length of the conduit. According to one embodiment, the sonic conduit tracer may automatically optimize, adjust, and/or calibrate its circuitry for the specific conduit size being traced. Such size-related transmitted audio characteristics may include audio spectral bandwidths, pulse repetition rates, pulse audio frequency(s), etc. A single transmitted frequency may be used, or a multiple frequency spread may be used to determine an estimated conduit length by analyzing the return effects of the various frequencies.

Thus, according to certain aspects, as an initial step, a sonic conduit tracer system 100 may be configured to determine the size of the conduit of interest. According to one embodiment and referring to FIGS. 1-3, the sonic conduit tracer system 100 may include one or more adapters 106A, 106B, 106C (collectively 106). The one or more adapters 106 may provide a range of sizes configured to fit (e.g., slip fit, detent fit, snap fit, press fit, etc.) into the ends of conduits having standard inside diameters (1-inch/2-inch/3-inch, etc.). Thus, an adapter sized to fit into one or more correspondingly-sized conduits may be attached (via, e.g., slip fit, detent fit, snap fit, press fit, etc.) to an end 108 or an output port of the sonic conduit tracer device body 101. For example, the sonic conduit tracer device body may be provided with an index key protrusion 109 configured to engage with recess 110 of an adapter.

According to one embodiment, the sonic conduit tracer system 100 may be equipped with a manual conduit size selector knob 103 or switch on the sonic conduit tracer device's body 101. This selector knob 103, upon being manually set by a user, would inform the sonic conduit tracer system which adapter size 106A, 106B, etc. was fitted to sonic conduit tracer device's body 101 and therefore which transmitted audio characteristics that are appropriate for a given conduit size to select.

Other embodiments may allow for an automatic conduit adapter size 106 determination. For example, a conductive strip 107A, 107B, 107C, etc. (collectively, 107) may be attached to the inside edge of each adapter 106. For each of the variously sized adapters, the location of each conductive strip 107A, 107B, etc., may be in a different offset location relative to the index key 109 and adapter indentation 110. As shown in FIG. 1 and also FIG. 3, the body 101 of the sonic conduit tracer device may be correspondingly provided with a plurality of different sets of sizing contacts 105A, 105B, 105C, etc. (collectively, 105). For any given size of adapter, the conductive strip 107 would align with and contact the appropriate sizing contacts on the device body 101. In this manner, each different conduit size adapter 106A, 106B, etc. would automatically inform the sonic conduit tracer system of which conduit size was being traced by electrically bridging only one pair of sizing contacts 105A, 105B, etc.

As FIG. 1 illustrates, when the sonic conduit tracer body index key 109 mates with adapter recess 110, for example, with 2-inch conduit size adapter 106A, the conductive strip 107A for that adapter 106A would match up with, for example, contacts 105A on the device body. Closing this specific electrical circuit would thus automatically indicate to the sonic conduit tracer system 100 that it has been fitted with a 2-inch adapter. Switch 104 may be provided to inform the sonic conduit tracer system whether to use a manual or automatic conduit size determination method.

Figure 2:
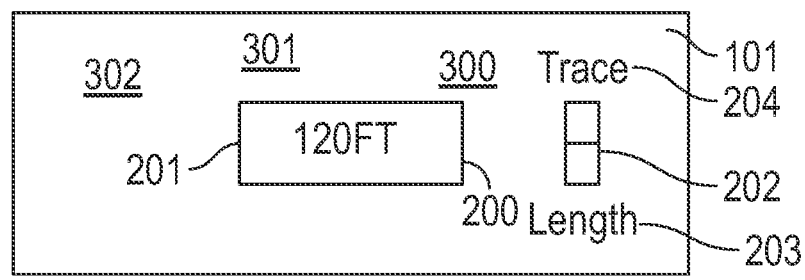
FIG. 2 schematically shows a side view of the sonic conduit tracer system of FIG. 1.

Operationally, at least a portion of the sonic conduit tracer system 100 (e.g., adapter 106 attached to body 101) may be configured to be inserted in a proximate end of the conduit being traced. Referring to FIG. 1, a power switch 102 may be provided to enable the sonic conduit tracer system 100. Referring to FIG. 2, a function switch 202 may be provided to select the particular operational mode of the sonic conduit tracer system 100. For example, when in "Length" mode 203, the sonic conduit tracer system 100 may send out a series of sonic pulses via a loudspeaker or a transducer of the transmitter 300 (see FIG. 3). Subsequently, a microphone of the receiver 301 may "listen" for returned sonic signal characteristics, such as the echo timing between the time of transmission pulses and the time of pulse echo return, the length of a "trailing tail" (length of a pulse's decay time), and/or other changed harmonic characteristics such as the attenuation of a part of a total sonic spectrum, or other sonic characteristic modifications. In a preferred embodiment, the transmitted signals are audio signals in the frequency range that a human is capable of hearing (as opposed to ultrasonic signals). There are several reasons for not utilizing ultrasonic frequencies. First, the conduit tracing system as disclosed would have the capability of tracing conduits that may be, for instance, over 100 feet in length, a distance which is well beyond the relatively short measurement range of ultrasonic sensor based measurement systems. Secondarily, the disclosed system provides an audible signal with which a person can readily determine from which conduit a sound is emanating from. During periods of transmission by transmitter 300, the microphone of the receiver 301 may be momentarily muted, and after the time interval when the transmission of a sound ceases, the microphone of the receiver 301 may be unmuted to receive and time the return echo(es).

Figure 3:
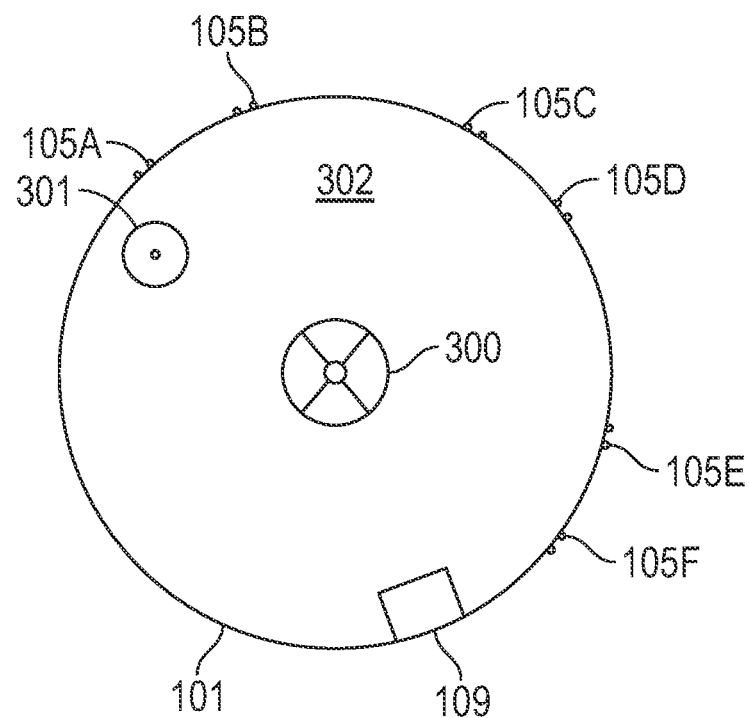
FIG. 3 schematically shows an end-on view of the sonic conduit tracer system of FIG. 1.

The transmitted and received sonic (e.g., audio) characteristics may be compared through various methods in common use such as by an audio spectrum analyzer 302 that may be built into the sonic conduit tracer system device body 101 (see FIGS. 1-3). For example, the spectrum analyzer 302 may determine the total trip (back and forth) timing interval (and therefore the distance using the known approximately 340 meters per second at sea level (at standard temperature and pressure) of a returned audio pulse delta (via echolocation), the timing of an audio characteristic degradation, etc. to determine a rough conduit length calculation for the conduit of interest. The estimated length 201 of the conduit may be displayed on readout 200 (see FIG. 2).

According to one embodiment, once the estimated length 201 of a conduit has been determined, the resultant estimated conduit length 201 may be utilized as a tool to limit the search distance or a search radius from the proximate end of a conduit, thus the estimated conduit length 201 may be determined and displayed and a search for conduit terminations that are located within that search distance from the proximate location may be conducted. In other words, a search from the starting point of the conduit in an arc commensurate with the estimated conduit length 201 may be conducted to find the appropriate equipment rooms, cabinets, etc. in which the distant end or termination of the conduit may be found.

According to one embodiment, the sonic conduit tracer system 100 may be switched between an audible presence or "trace" mode 204 or a "length determining" mode 203 by the switch 202 (see FIG. 2). Operationally, the search mode 204 may utilize a combination of sonic/audio frequencies (or alternating audio frequencies), pulse repetition rates, and audio cadences that are designed to be quite distinctive and different from sounds usually experienced in daily life. Sounds such as "white noise," may be utilized in either "length" 203 mode or "trace" mode 204. The audio frequency and/or characteristic selection may also be automatically selected based on the particular conduit size and/or determined estimated conduit length in order to maximize the perceived audio level at the opposite or distant end of the conduit.

As different diameter conduits have different resonant lengths and subsequent effects on audio characteristics, a further embodiment of the sonic conduit tracer system 100 may feature an adjustable spectral range and pulse repetition rate to optimize its use relative to a particular conduit size, similar to how organ pipes are tuned to allow a pipe to "speak" (resonate) properly. As the sonic conduit tracer 100 always has access to one end of a conduit, the conduit size may be readily determined, as disclosed above, and the appropriate transmitted sonic adjustment(s) setting made automatically or manually.

Once the search radius arc is known, then a person only needs to visit those locations within and covered by the search arc and listen for the distinctive transmitted sound(s). If a particular location is silent (yet the system determined that the distal end was open), then the search person may immediately go on to the next location rather than wasting time at that location by further checking conduits to identify a particular conduit at that location that does not present a distinctive, tell-tale sound. Furthermore, often conduits may start at a common starting point but terminate, for instance, on different floors of a building. By knowing the approximate or estimated length of a conduit, if all of the matching arc search locations on a floor have been searched without any sound present, then at that point by subtracting the floor-to-floor measurement from the total estimated conduit length, then a new smaller arc may be determined and searched in the same manner as before on the adjacent floor(s). This length subtraction process may be subsequently repeated until the distant end of the conduit is found.

It is expected that a sonic conduit tracer will be especially advantageous and provide for labor-savings in several ways: first, a sonic conduit tracer and location process may be optionally accomplished by only a single person, as compared to the traditional two-person requirement (although more than one person would certainly speed up the sonic conduit tracer process as well). Second, it will make the job of a conduit localization within an identified area much easier to accomplish as the need to further search entire sections of a room, area, etc. can be immediately dismissed.

Figure 4:
FIG. 4 schematically shows a physically introducible sonic conduit tracer system according to another embodiment of the present disclosure.

According to another aspect, as shown in FIG. 4, a sonic conduit tracer system 400 may be provided. System 400 may be sized to loosely "slip fit" appropriately sized units 400 inside an empty electrical conduit or pipe. Further, the system 400 may be configured to be attached to a flexible conduit feeder 401, for example, a common wire conduit "snake" tool. The snake tool 401 may be used to push the appropriately-sized sonic conduit tracer system 400 through a conduit 404 so as to allow placement of the sonic conduit tracer system 400 closer to a distant or termination end of the conduit. Inside the conduit, the sonic conduit tracer system 400 may actively transmit or emit a distinctive tone 402. According to certain embodiments, system 400 may include only the sonic transmitter sized to fit inside a conduit. System 400 would be especially suited for use with a vertical conduit wherein gravity would assist the conduit feeding process.

According to certain aspects, a method of tracing a conduit includes transmitting a sonic signal down an interior length of an empty conduit from a proximate end of the conduit, receiving a sonic return signal at the proximate end of the conduit, and analyzing the sonic return signal to determine an estimated length of the conduit. The sonic signal may be an audio frequency signal and/or a near-audio frequency signal. According to some embodiments, the step of analyzing may include determining the estimated length of the conduit based on one or more differences between the transmitted signal and the return signal. For example, the step of analyzing may include determining the estimated length of the conduit based on a delay between the time of a transmitted pulse and the time of a return echo pulse, a time for a transmitted pulse to decay to a predetermined level, a change in harmonic characteristics, and/or an attenuation of a part of a total spectrum of the audio transmitted signal.

According to other embodiments, the step of transmitting a signal may include transmitting an audio signal having a pulsed signal, transmitting a continuous audio signal having a single frequency, transmitting a continuous audio signal having a multiple frequency spread, transmitting an audio signal having a first spectral bandwidth, transmitting an audio signal having a first pulse repetition rate and/or transmitting a signal having a first pulse frequency characteristic. According to another embodiment, the step of transmitting may include transmitting a first signal having a first spectral bandwidth, a first pulse repetition rate and/or a first pulse frequency characteristic, and then transmitting a second signal having a second spectral bandwidth, a second pulse repetition rate and/or a second pulse frequency characteristic. According to even another embodiment, the step of transmitting may include transmitting sound audio "white noise" down the length of the conduit. Since "white noise" encompasses a broad audio frequency range at a uniform intensity e.g. all frequencies at the same intensity, it is particularly well suited to determining specific frequency audio attenuation relative to conduit length.

According to another aspect, the method of tracing a conduit may further include automatically determining an interior diameter of the conduit. Further, the step of transmitting may include transmitting a first signal when the conduit has a first interior diameter and transmitting a second signal, different from the first signal, when the conduit has a second interior diameter.

Figure 5:
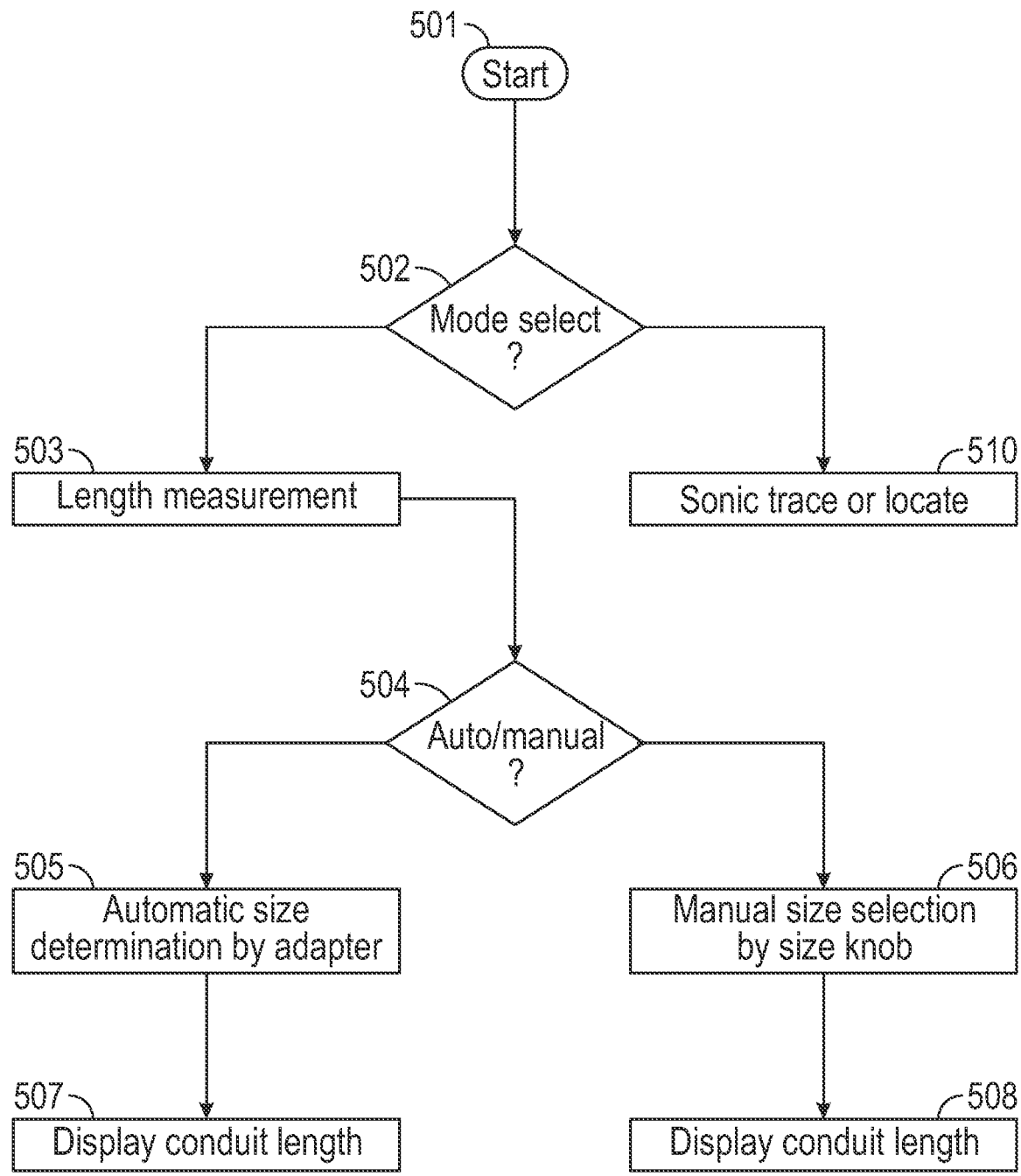
FIG. 5 is a flow chart showing a method of operating a sonic conduit tracer system in accordance with embodiments of the present disclosure.

Referring to FIG. 5, a flow chart showing an exemplary method of using the sonic conduit tracer system 100 is shown. In step 501, the sonic conduit tracer system 100 is associated with a conduit, for example, by inserting an adapter 106 into the proximate end of an empty conduit. In step 501, the sonic conduit tracer system 100 is enabled via switch 102. In step 502, the mode of the sonic conduit tracer system 100 is selected. The mode may be selected via switch 202 as either "trace" or "length."

If the "length" mode is selected, the sonic conduit tracer system 100 proceeds to step 503. In steps 505 and 506, the size of the conduit is determined (either by a user or automatically as disclosed above). In step 504, the switch 104 is used to select whether the size of the conduit is to be determined manually in step 506 or automatically in step 505. Once the size of the conduit is determined, the transmitter 300 may emit an audio signal, the receiver 301 may receive the audio return signal, and the spectrum analyzer 302 may determine an estimated length 201 of the conduit in step 507 or step 508.

After the length of the conduit has been determined, the mode of the sonic conduit tracer system 100 may be switched to a "trace" or "locate" mode in step 502 (via switch 202). In step 510, the transmitter 300 may transmit a signal that is distinct from any background noise to facilitate a user locating the distance end of the conduit by aural means.

A visual sonic conduit locator for determining which conduit amongst a plurality of empty conduits within a general area is emitting sounds from an active sonic conduit tracer system 100 is herein disclosed. A sonic conduit tracer system 100 is limited in situations where a plurality of conduits terminate near one another. In these situations, a visual sonic conduit locator is useful in determining the location of a target conduit being fed with a signal(s) from a sonic conduit tracer system 100.

Figure 6:
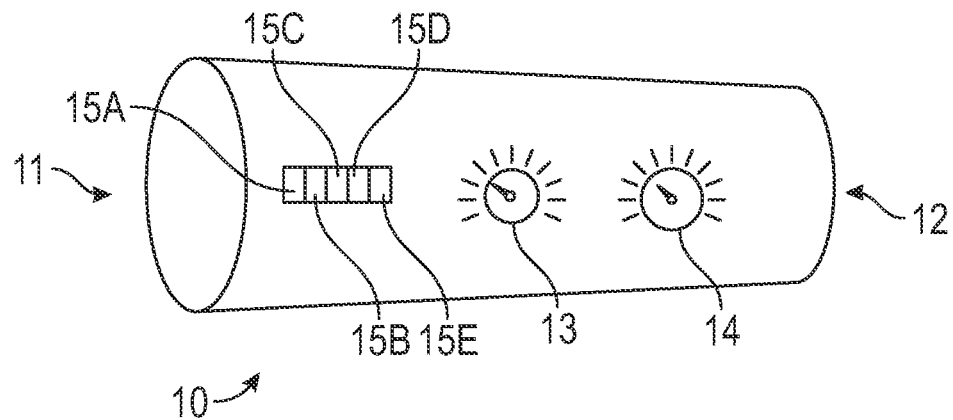
FIG. 6 schematically shows a visual sonic conduit locator in accordance with embodiments of the present disclosure.

Referring to FIG. 6, a visual sonic conduit locator 10 is shown in accordance with the present disclosure. The locator 10 includes a body having a proximal end 11 and a distal end 12, a conduit size audio filter control 13, a sensitivity control 14, and visual indicators 15A-15E. The conduit size audio filter control 13 is configured to set a processor(s) (not shown in FIG. 6, but shown in FIG. 9) of the locator to seek a signal(s) for a particular size of the target conduit. When the size of the target conduit is set, the conduit size audio filter control 13 can filter, selectively look for and identify characteristic sounds from a sonic conduit tracer system 100 (e.g., FIG. 1). In some embodiments, as shown in FIG. 6, the conduit size audio filter control 13 is a selector switch, however, other control selection mechanisms are within the scope of the present disclosure. The sensitivity control 14 is configured to be adjusted in order to have the locator 10 detect a target sound and alter the amount of the target sound that is indicated at a visual display level. The visual display level is represented by visual indicators 15A-15E. The visual indicators 15A-15E are configured to visually display a received audio level detected by the locator 10 as adjusted by the sensitivity control 14. In some embodiments, the locator 10 is a hand-held device.

In some embodiments, the visual sonic conduit locator 10 is enabled by an on-off switch. The on-off switch may be a momentary type or a fixed position type.

In some embodiments, a handle is connected at or near the proximal end 11 of the body. The handle can be permanently connected or a detachably connected part of the locator 10.

According to some embodiments, the visual sonic conduit locator 10 has an audio spectrum analyzer set to optimize for a specific target conduit size. After the target conduit size is configured by the conduit size audio filter control 13, the visual sonic conduit locator 10 is configured to detect or seek for specific audio frequencies, cadence patterns, or other distinctive sound properties. Through this configuration, the locator 10 detects the target sound produced by the sonic conduit tracer system 100 via the target conduit. As disclosed above, different size conduits (e.g. differing conduit inner diameters) have inherently different deteriorating effects on various audio frequencies, so it is important to configure the conduit size audio filter control 13 to the target conduit size to accommodate for these effects. In some embodiments, the conduit size audio filter control 13 is configured to automatically determine the diameter of the target conduit based on the target signal. Since differently sized conduits have different deteriorating effects on audio frequencies, the conduit size audio filter control 13 is configured to automatically determine the size of the target conduit by recognizing the presence of one or more of these effects. In some embodiments, the conduit size audio filter control 13 is configured to be manually adjusted by the operator or user for setting the size of the target conduit from which a received signal is to be detected from.

It is expected that a visual sonic conduit locator 10 will be advantageous in several ways. First, it will be able to visually discern changes in an audio level to a finer degree than is possible with an unaided person looking for a target sound and target conduit by ear. Second, while the human ear can quickly generalize the location of a sound within a small area, the task of determining which specific conduit is the target conduit generating the target sound amongst a plurality of conduits is a cumbersome and time-consuming process. This is especially true in an area of high ambient noise, such as a construction site. Third, the locator 10 provides an intuitive, all-in-one user interface that helps the operator achieve the goal of finding the target conduit quickly and reliably. The locator 10 does not require additional sensors to aid in finding the target conduit. Fourth, the locator 10 allows a hearing-impaired person to be able to locate the distal end of a conduit.

According to some embodiments, the visual sonic conduit locator 10 is configured to permit an operator or user to adjust the sensitivity control 14 which alters the amount of the target sound to that of a visual display level. The visual display level is represented by the visual indicators 15A-15E. As the operator gets closer to the target conduit, the visual display level becomes more pronounced in that more visual indicators 15A-15E activate and/or a different type of indication is provided (e.g., the color intensity of an indicator, a shape or message on a display).

According to another aspect, the sensitivity control 14 is configured to detect the target sound using linearly arranged visual indicators 15A-15E. The visual indicators 15A-15E are configured to correspondingly activate as the target sound increases in volume. For example, if the target sound is far away from the locator 10, only a first visual indicator 15A may be illuminated. As the locator 10 approaches the target sound, a processor of the locator is configured to cause one or more additional visual indicators 15B-E to individually activate as the magnitude of the target sound detected increases. Once all visual indicators 15A-15E are illuminated the sensitivity control 14 may be lowered by the user to set the processor sensitivity from detected signals at the microphone(s), which causes the processor to deactivate some or all visual indicators 15A-15E to narrow down the location of the target conduit emitting the target sound for the user. This process is reiterated until the target conduit is located by the user with the guiding functionality of the locator.

In some embodiments, as seen in FIG. 6, a linearly arranged column of LED or other light fixtures are the visual indicators 15A-15E. Operationally, the sensitivity control 14 is initially set to its maximum sensitivity setting so as to more easily provide an initial indication/detection of sound(s) emanating within a particular area. Once an initial sound(s) detection is made, the sensitivity control 14 is typically adjusted to a lower sensitivity setting in order to better allow strength differentiation to occur. As the purpose of the device is to visually 'zero-in' on a specific conduit, the goal is to allow an operator be able to see a rise of fall of the visual indicator(s) which allows the effect of three-dimensional movement to vary the results of the visual display, thus serving as a visual guide to the desired conduit.

An optimum sensitivity setting is one that allows a user to be able to visually see a rise or fall in either direction, without falling below a visual detection threshold, or rising past a device's maximum display capability, which would then prevent further directional guidance. Sensitivity control 14 is typically adjusted in this fashion to provide an initial less than full-scale reading on the column of LED or other visual indicators 15A-15E. As directional movement toward the 'target' conduit proceeds, the device is getting closer and closer to its target with a corresponding increase in displayed value, so typically the sensitivity control 14 may manually be readjusted by the operator in the direction of less sensitivity until the conduit is actually located. A full-scale reading is the maximum amplitude a system can represent for any sensitivity level. As the visual indicators 15A-15E are illuminated, the sensitivity control 14 is adjusted by the operator to keep a level of 'headroom' available until the target conduit is located. Headroom in this instance should be understood to mean the difference between an instant reading value and the highest or lowest level reading that can be displayed on an indicator or meter of a device. By configuring the headroom with the sensitivity control 14, the operator can ensure that further up or down display levels are able to be discerned. In some embodiments, the visual display level comprises a lighting indicator that increases in brightness and/or changes color as the operator gets closer or farther from the target sound.

In some embodiments, the visual display level comprises a digital numerical scale having an identified numerical value range. The digital numerical value increases as the operator gets closer to the target sound. The sensitivity control 14 is configured to cause a processor of the locator 10 to increase or decrease the numerical value of the scale to help locate the target sound. For example, the identified numerical value range can be configured to range from 0 to 100. As the locator 10 gets closer to the target sound, the value in the scale increases. As the locator 10 approaches 100, the operator should lower the sensitivity control 14 to allow for additional headroom.

Figure 7:
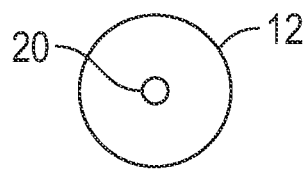
FIG. 7 schematically shows an end view of the visual sonic conduit locator of FIG. 6.

Referring to FIG. 7, the distal end 12 of the visual sonic conduit locator 10 is shown in accordance with the present disclosure. A directional microphone 20 is located at the distal end 12 of the locator 10. The microphone 20 is configured to detect signal(s) of the target sound. A directional microphone 20 is arranged to be more sensitive to detecting sounds received from one or more specific directions than other directions. The use of a directional microphone 20 is advantageous in that the operator can locate the target sound by pointing the microphone 20 at different conduits. The directional microphone 20 primarily picks up sound coming from the direction the microphone 20 is directed towards.

In some embodiments, a plurality of directional microphones is located at the distal end 12 of the visual sonic conduit locator 10. The plurality of microphones is configured to detect signal(s) of the target sound. Each of the plurality of directional microphones can be positioned in the same direction, different directions, or be configured to cover different parts of the aural spectrum.

Figure 8:
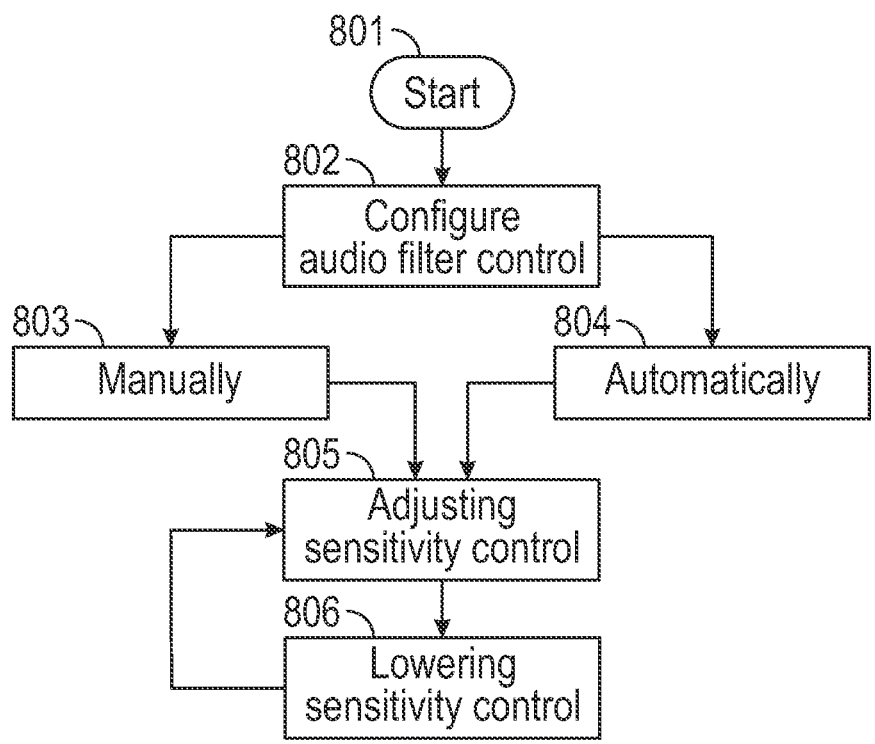
FIG. 8 is a flow chart showing a method of operating a visual sonic conduit locator in accordance with embodiments of the present disclosure.

Referring to FIG. 8, a flow chart showing a method of operating a visual sonic conduit locator (e.g. locator 10 of FIG. 6) in accordance with present disclosure. The method begins at start block 801 and proceeds to block 802 where a conduit size audio filter control of the locator is configured or adjusted to selectively optimize the search for a target sound from a target conduit size (e.g. inner diameter selection). The step 802 of configuring occurs either manually at block 803 or automatically at block 804. Then, at block 805, the sensitivity control 14 is adjusted by a user to alter the sensitivity of a processor of the locator 10 monitoring signals detected by the microphone(s) 20 of a detected target sound detected and indicating levels of detected sound signals at the visual indicator 15A-15E. The user proceeds to block 806 and lowers the sensitivity control until the target conduit conducting the target sound is located. According to some embodiments, the step 802 of configuring a conduit size audio control may include determining the conduit size and the specific audio frequency, cadence pattern, or other distinctive sound property. The step of configuring may also include identifying deteriorating effects on the target sound. For example, the different sizes of a target conduit have different deteriorating effects on the target sound. By identifying the different size, the deteriorating effects on the target sound can then be determined. The conduit size audio control 13 is configured automatically by identifying the deteriorating effects that the size of the target conduit has on the target sound based on stored predetermined information (e.g. a table of different sound deteriorating effects with respect to different conduit sizes).

According to some embodiments, the step 805 of adjusting the sensitivity control 14 to change the degree the target sound is indicated at a visual indicator 15A-15E includes determining whether the visual sonic conduit locator 10 is physically approaching the target sound. For example, if a processor of the visual sonic conduit locator 10 determines the locator 10 is moving away from the target sound, then the operator needs to either move the locator 10 closer to the target sound or adjust the sensitivity control 14 to assist in locating the target sound.

According to some embodiments, the step 806 of lowering the sensitivity control 14 until the target sound and target conduit is located includes determining, utilizing visual indicators 15A-15E, the amount of headroom to leave available. For example, if visual indicators 15A-15C are illuminated, then the operator may not lower the sensitivity control 14 because there is still headroom available to search for the target sound and target conduit, as visual indicators 15D and 15E are not illuminated. However, if visual indicators 15A-15E are all illuminated, then the operator may lower the sensitivity control 14 to allow for more headroom. By lowering the sensitivity control 14, some of the visual indicators 15A-15E deactivate. These visual indicators 15A-15E are configured to activate again as the visual sonic conduit locator 10 gets increasingly close to the target conduit. This process is reiterated until the target conduit is located.

Figure 9:
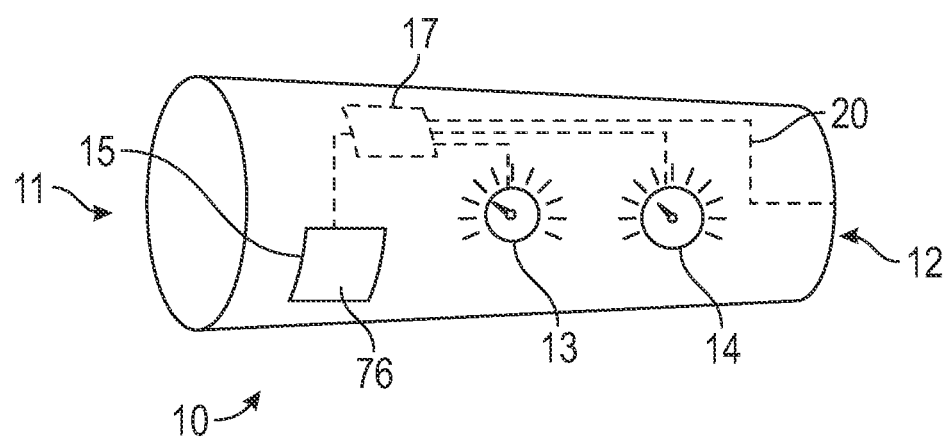
FIG. 9 schematically shows a visual sonic conduit locator in accordance with embodiments of the present disclosure.

Referring to FIG. 9, a visual sonic conduit locator 10 is shown in accordance with the present disclosure. The visual sonic conduit locator 10 of FIG. 9 substantially corresponds to the visual sonic conduit locator 10 of FIG. 6 except the visual indicator 76 is in the form of a single display configured to provide a numerical indication of the magnitude of the sound level or any other desired graphical indication that conveys a sense of magnitude within a range. Also, the internal processor 17 is shown in phantom lines with control lines to the audio filter control 13, and sensitivity control 14, display 76 and microphone 20.

While the present disclosure has been illustrated and described with respect to particular embodiments thereof, it should be appreciated by those of ordinary skill in the art that various modifications to this disclosure may be made without departing from the spirit and scope of the present disclosure.

What is claimed is:

1. A visual sonic conduit locator comprising:
   a body;
   a microphone connected to the body;
   one or more visual indicators connected to the body;
   a processor operatively connected to the one or more visual indicators and configured to cause the one or more visual indicators to display a magnitude of sound level relative within a variably adjustable full-scale range based on a sound signal detected by the microphone; and
   a sensitivity control configured to cause the processor to adjust the full-scale range thereby setting the processor to more sensitively or less sensitively cause the one or more visual indicators to display the magnitude of sound level based on the sound signal detected by the microphone.

2. The visual sonic conduit locator according to claim 1, wherein the microphone is arranged at a distal end of the body.

3. The visual sonic conduit locator according to claim 1, wherein the microphone is a directional microphone.

4. The visual sonic conduit locator according to claim 1, further comprising an audio filter control configured to set the processor to identify a sound signal or sound deteriorating effect predetermined as corresponding to a sound signal conducted within a conduit of a particular size.

5. The visual sonic conduit locator according to claim 4, wherein the audio filter control is configured to be manually adjusted by a user for setting the particular size.

6. The visual sonic conduit locator according to claim 4, wherein the processor is configured to automatically adjust the audio filter control based on the sound signal detected.

7. The visual sonic conduit locator according to claim 6, wherein the processor is configured to identify deteriorating effects of the sound signal detected by the microphone for automatically adjusting the audio filter control.

8. The visual sonic conduit locator according to claim 1, wherein the sensitivity control is configured to adjust the full-scale range based on a level of headroom available.

9. The visual sonic conduit locator according to claim 1, wherein the one or more visual indicators comprises a digital numerical scale.

10. The visual sonic conduit locator according to claim 1, wherein the one or more visual indicators comprises a plurality of LEDs.

11. The visual sonic conduit locator according to claim 10, wherein the plurality of LEDs are linearly arranged and the processor is configured to cause the plurality of LEDs to sequentially illuminate based on the magnitude of sound level determined to be indicated relative to the full-scale range.

12. The visual sonic conduit locator according to claim 1, wherein the one or more visual indicators comprise a lighting fixture.

13. The visual sonic conduit locator according to claim 12, wherein the processor is configured to cause the lighting fixture to increase in brightness and/or change color when the magnitude of sound level increases.

14. A method of operating a visual sonic conduit locator comprising:
   moving a visual sonic conduit locator in an area where a sound signal is provided from a sonic conduit tracer system through a target conduit among a plurality of conduits;
   detecting the sound signal with a microphone of the visual sonic conduit locator;
   displaying a magnitude of sound level of the detected sound signal with one or more visual indicators of the visual sonic conduit locator; and
   adjusting a sensitivity control to cause a processor of the visual sonic conduit locator to adjust a full-scale range.

15. The method according to claim 14, wherein the adjusting the sensitivity control of the visual sonic conduit locator is performed after the visual sonic conduit locator is moved closer to the target conduit.

16. The method according to claim 14, wherein the microphone is a directional microphone.

17. The method according to claim 14, wherein the adjusting the sensitivity control of the visual sonic conduit locator comprises setting the processor to less sensitively cause the one or more visual indicators to display the magnitude of sound level of the detected sound signal.

18. The method according to claim 14, wherein the adjusting the sensitivity control of the visual sonic conduit locator comprises determining an amount of headroom available.

19. A visual sonic conduit locator comprising:
a body;
a microphone connected to the body;
a display connected to the body and configured to display a magnitude of sound level based on a sound signal detected by the microphone; and
a sensitivity control configured to adjust a range the magnitude of sound level is displayed within through the display.

20. The visual sonic conduit locator according to claim 19, wherein the display is configured to indicate a numerical indication of the magnitude of sound level.

* * * * *